(12) United States Patent
Misawa

(10) Patent No.: US 8,928,912 B2
(45) Date of Patent: Jan. 6, 2015

(54) PRINTING CONTROL DEVICE, IMAGE FORMING SYSTEM AND COMPUTER READABLE MEDIUM STORING PROGRAM

(75) Inventor: Satoshi Misawa, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 620 days.

(21) Appl. No.: 12/886,109

(22) Filed: Sep. 20, 2010

(65) Prior Publication Data

US 2011/0235101 A1    Sep. 29, 2011

(30) Foreign Application Priority Data

Mar. 23, 2010    (JP) ................................ 2010-066229

(51) Int. Cl.
*G06F 3/12* (2006.01)
*G06K 15/02* (2006.01)

(52) U.S. Cl.
CPC ............ *G06F 3/1288* (2013.01); *G06F 3/1212* (2013.01); *G06F 3/1215* (2013.01); *G06F 3/124* (2013.01); *G06F 3/125* (2013.01); *G06F 3/1251* (2013.01); *G06F 3/1282* (2013.01); *G06K 15/1857* (2013.01); *G06K 2215/0094* (2013.01)
USPC ........................................................ 358/1.15

(58) Field of Classification Search
CPC .......................... G06K 15/1857; G06F 3/1281
See application file for complete search history.

(56) References Cited

U.S. PATENT DOCUMENTS

| 6,783,288 B2 | 8/2004 | Kato | |
| 8,488,168 B2 | 7/2013 | Tokumoto | |
| 8,605,326 B2 | 12/2013 | Yomogisawa | |
| 2004/0196498 A1* | 10/2004 | Klassen | 358/1.15 |
| 2004/0239988 A1* | 12/2004 | Kato | 358/1.15 |
| 2008/0285074 A1* | 11/2008 | Wilson | 358/1.15 |
| 2009/0244565 A1 | 10/2009 | Yomogisawa | |
| 2010/0290080 A1* | 11/2010 | Klassen | 358/1.15 |

FOREIGN PATENT DOCUMENTS

| CN | 1396517 A | 2/2003 |
| CN | 101140506 A | 3/2008 |
| CN | 101546384 A | 9/2009 |
| JP | A-2001-282494 | 10/2001 |

(Continued)

OTHER PUBLICATIONS

Jun. 9, 2014 Chinese Office Action issued in Application No. 201010517437.4 (with English translation).

(Continued)

*Primary Examiner* — Kimberly A Williams
*Assistant Examiner* — John Wallace
(74) *Attorney, Agent, or Firm* — Oliff PLC

(57) ABSTRACT

A printing control device includes units that: distribute received image data page by page, perform image processing for converting the image data distributed by page into print data, and control output in accordance with a plurality of image output sections, and control the output processing of each of the plurality of the image output sections based on the print data generated by the image processing, when aggregate printing where images of a plurality of pages are merged into one image is executed. The image data is distributed so that the image data is subjected to the image processing by a single image processing unit. The plurality of the output control units generate print data in a plurality of pages by combining the plurality of page print data transferred from the image processing units, and transmit the generated print data to the image output sections corresponding to the output control units.

6 Claims, 11 Drawing Sheets

(56) References Cited

FOREIGN PATENT DOCUMENTS

| JP | A-2004-192507 | 7/2004 |
| JP | A-2005-92444 | 4/2005 |
| JP | A-2007-310450 | 11/2007 |
| JP | A-2011-098500 | 5/2011 |
| JP | A-2003-022170 | 1/2013 |

OTHER PUBLICATIONS

Dec. 25, 2013 Office Action issued in Japanese Application No. 2010-066229 (with English Translation).

* cited by examiner

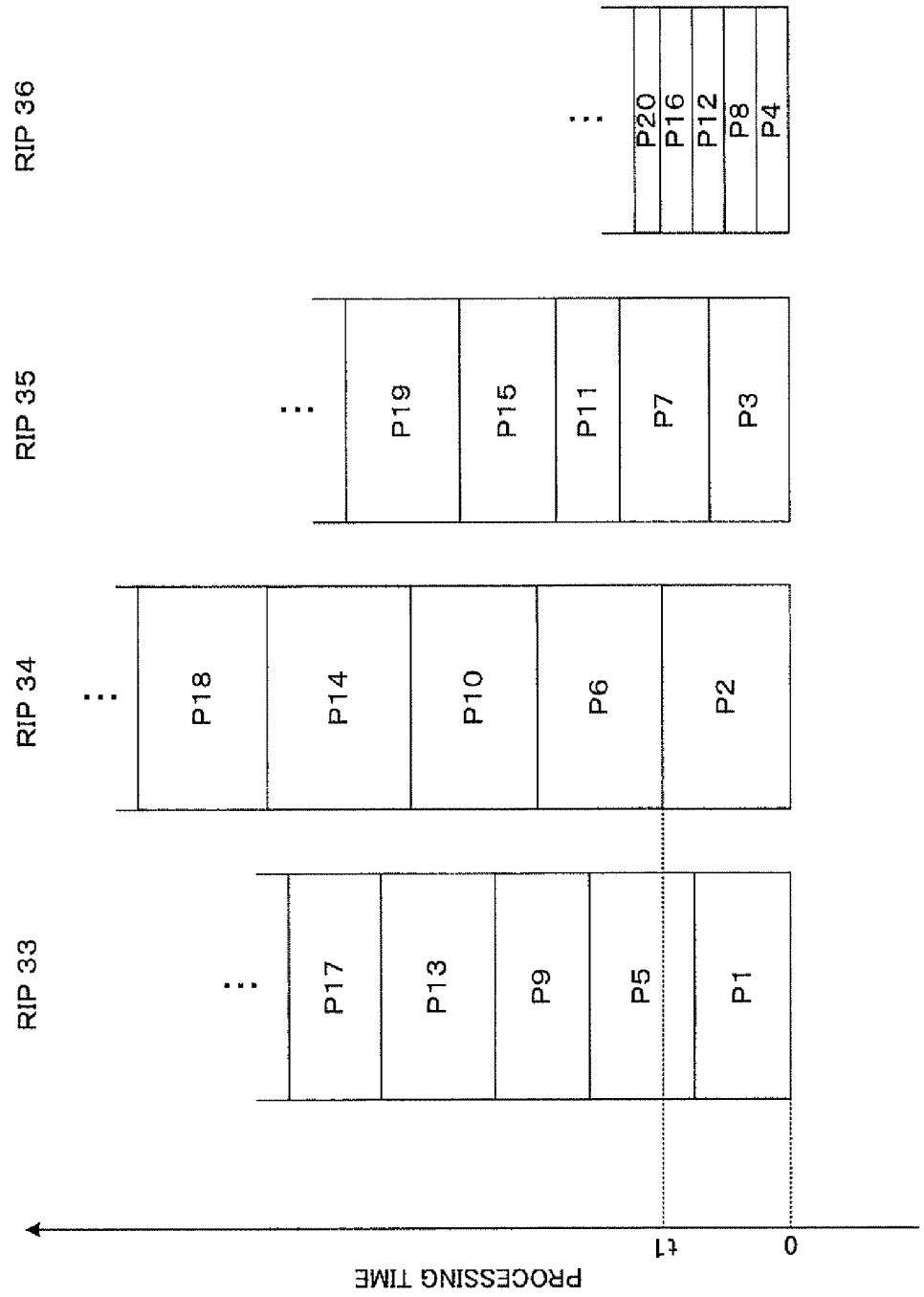

PRINTING CONTROL DEVICE, IMAGE FORMING SYSTEM AND COMPUTER READABLE MEDIUM STORING PROGRAM

CROSS-REFERENCE TO RELATED APPLICATIONS

This application is based on and claims priority under 35 USC 119 from Japanese Patent Application No. 2010-066229 filed Mar. 23, 2010.

BACKGROUND

Technical Field

This present invention relates to a printing control device, an image forming system and a computer readable medium storing a program.

SUMMARY

According to an aspect of the invention, there is provided a printing control device including: a distributing unit that distributes received image data page by page, a plurality of image processing units that perform image processing for converting the image data distributed by page from the distributing unit into print data, and a plurality of output control units that are provided in accordance with a plurality of image output sections respectively, and control the output processing of each of the plurality of the image output sections based on the print data generated by the image processing of the plurality of the image processing units, respectively; when aggregate printing where images of a plurality of pages are merged into one image and be output is executed, the distributing unit distributes the image data so that the image data of the plurality of pages are subjected to the image processing by a single image processing unit, and wherein the plurality of the output control units generate print data in units of plurality of pages by combining the plurality of page print data transferred respectively from the plurality of the image processing units, and transmit the generated print data to the image output sections corresponding to the output control units, respectively.

BRIEF DESCRIPTION OF THE DRAWINGS

An exemplary embodiment of the present invention will be described in detail based on the following figures, wherein:

FIG. 11 is a diagram illustrating the time course of the image processing with the RIPs 33 to 36 in the case where the distributing processor 32 distributes each image data of logical pages to the RIPs 33 to 36 in the second distributing method.

DETAILED DESCRIPTION

Next, the exemplary embodiment of the present invention will be described in details based on the drawings.

Figure 1:
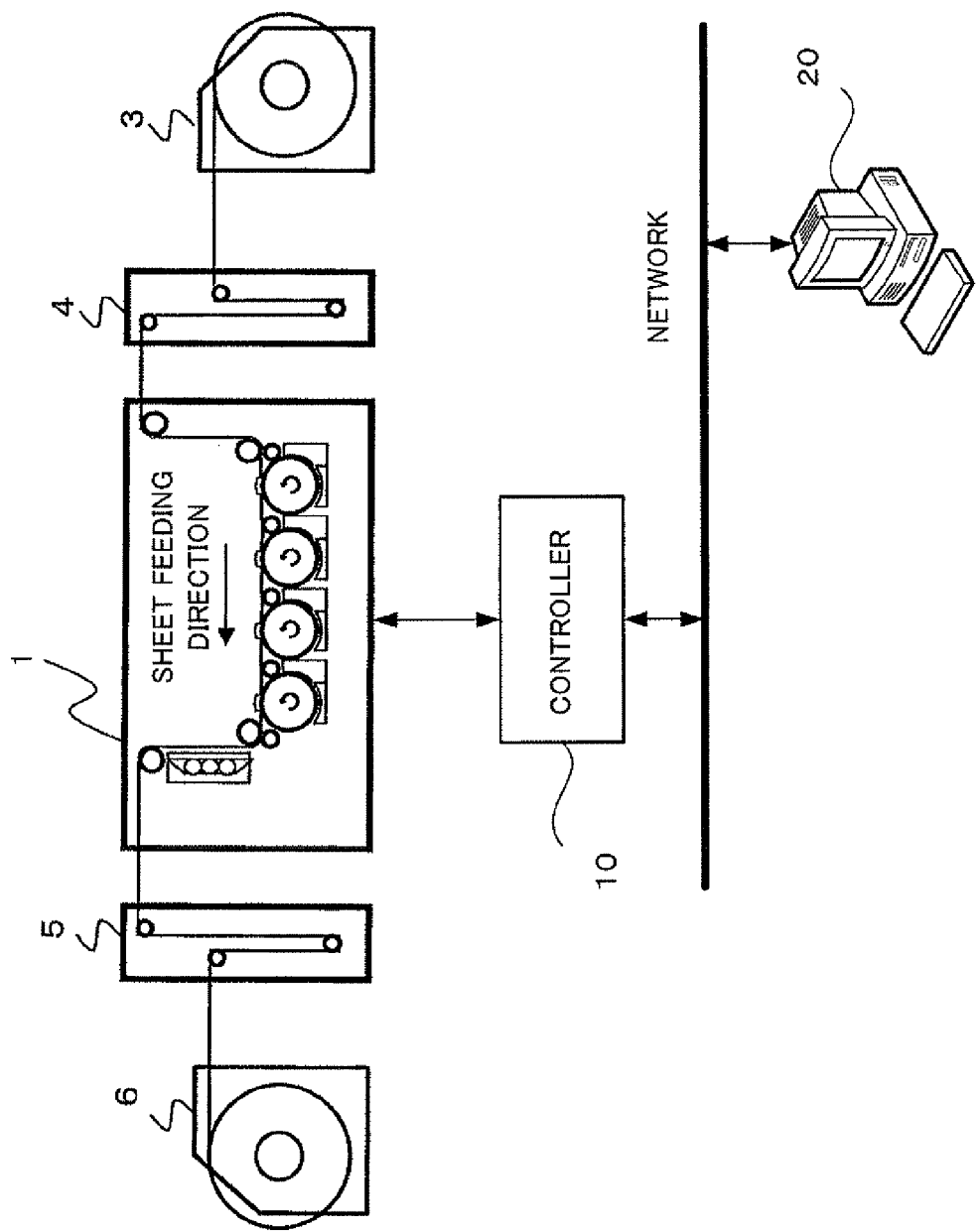
FIG. 1 is a diagram illustrating a system configuration of an image forming system according to the exemplary embodiment of the present invention.

FIG. 1 is a diagram illustrating a configuration of an image forming system according to the exemplary embodiment of the present invention. The image forming system has, as shown in FIG. 1, a pre-processing device 3, buffer devices 4 and 5, a printing device 1, post-processing device 6, controller 10, and a terminal device 20.

The pre-processing device 3 performs pre-processing such as feeding of an unprinted continuous paper. The post-processing 6 performs post-processing such as taking-up of a printed continuous paper. The buffer devices 4 and 5 are provided for e.g. retaining each tension of the continuous papers between the pre-processing device 3 and the printing device 1, and between the printing device 1 and the post-processing device 6, respectively.

The terminal device 20 generates a print job by i.e. a print request and transmits the print job to the controller 10 via a network. The controller 10 serves as a printing control device for controlling the printing with the printing device 1 based on the print job transmitted from the terminal device 20. The printing device 1 outputs an image corresponding to the print job onto the continuous paper based on the control of the controller 10.

Next, the hardware configuration of the foregoing controller 10 will be described with reference to the block diagram of FIG. 2.

Figure 2:
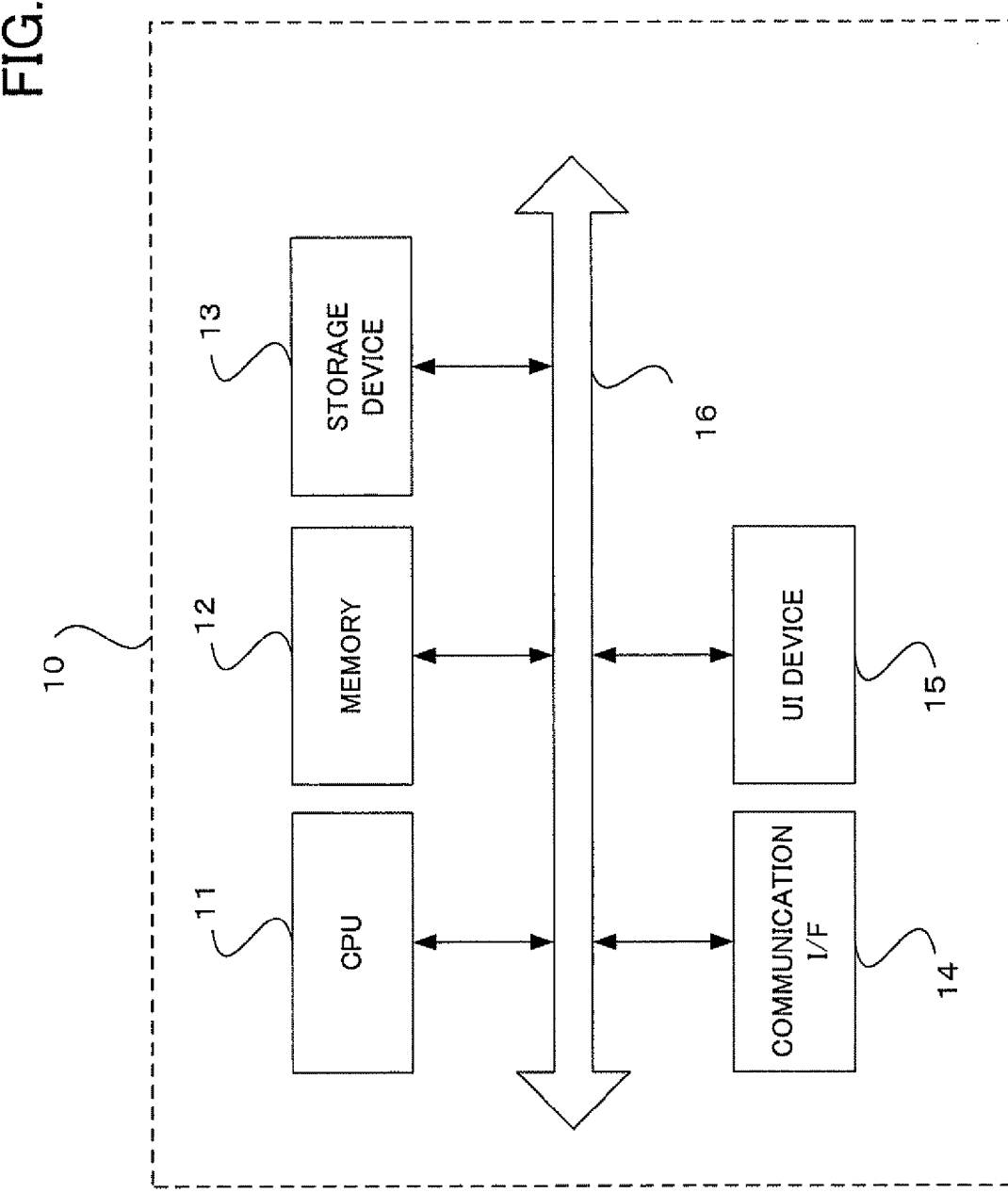
FIG. 2 is a block diagram illustrating a hardware configuration of a controller 10 according to the exemplary embodiment of the present invention.

As shown in FIG. 2, the controller 10 has CPU 11, a memory 12, a storage device 13 such as a hard disk drive (HDD), a communication interface (I/F) 14 for transmitting or receiving data from or to the terminal device 20 or the like via the network, a user interface (UI) 15 having a touch panel or a liquid crystal display and a key board. These components are connected together via a control bus 16.

The CPU 11 controls the operation of the controller 10 by executing predetermined processing based on the control program stored in the memory 12 or the storage device 13. In the exemplary embodiment of the present invention, besides the control program which is stored in the memory 12 or the storage device 13, the CPU 11 may use a control program stored in a recording medium such as a CD-ROM.

Figure 3:
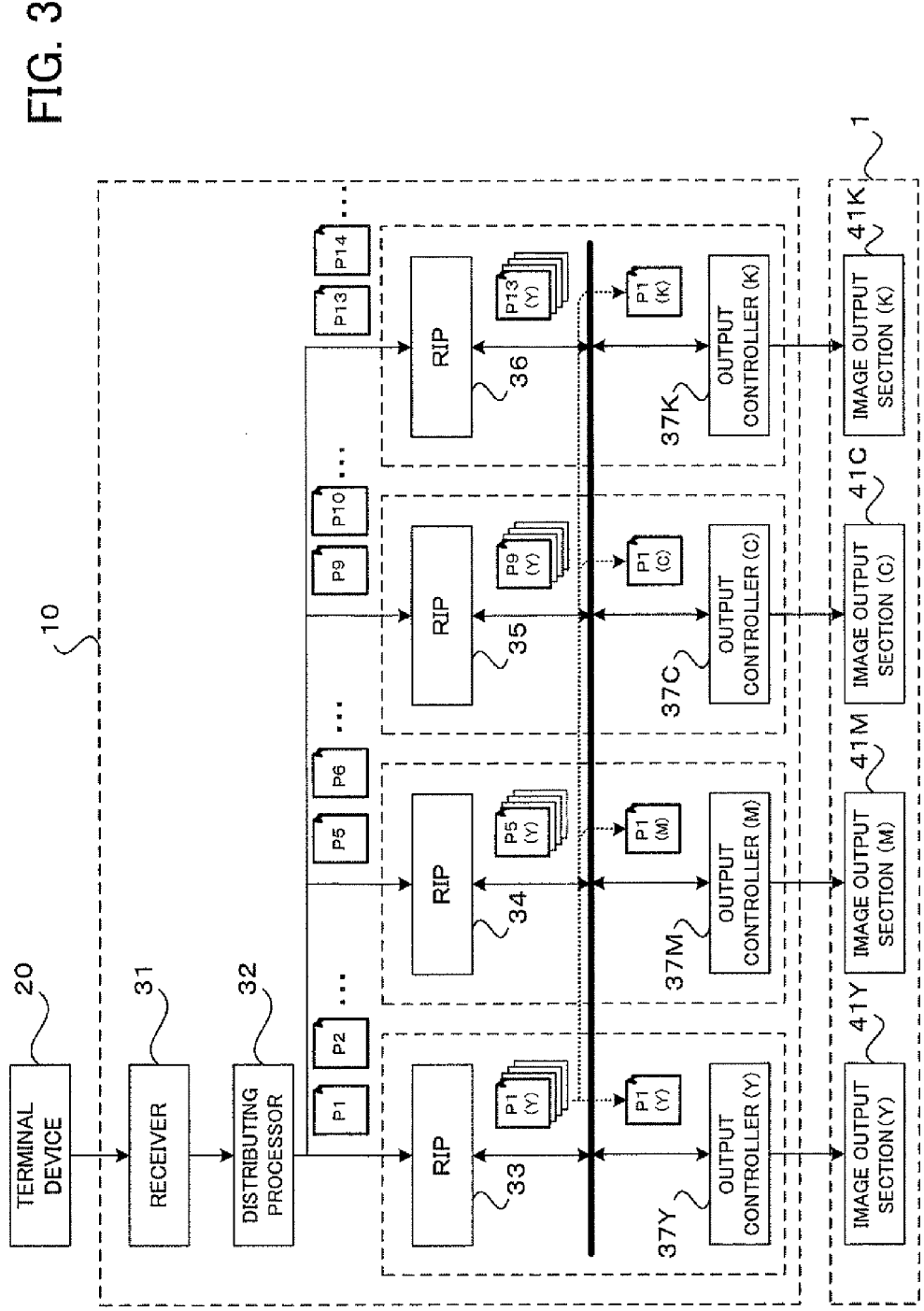
FIG. 3 is a block diagram illustrating a functional configuration of the controller 10 according to the exemplary embodiment of the present invention.

FIG. 3 is a block diagram illustrating a functional configuration of the controller 10 performed corresponding to the execution of the above control program.

The controller 10 according to the exemplary embodiment of the present invention has, as shown in FIG. 3, a receiver 31, a distributing processor 32, Raster Image Processors (RIPs) 33 to 36, and output controllers 37Y, 37M, 37C, and 37K. The printing device 1 has four image output sections, i.e. print engines, 41Y, 41M, 41C, and 41K which are corresponding to four colors, yellow(Y), magenta(M), cyan(C), and black(K) respectively.

The receiver 31 receives the print job transmitted from the terminal device 20. Subsequently, the distributing processor 32 distributes the image data included in the print job which is received in the receiver 31, to the RIPs 33 to 36 in page units.

In particular, when aggregate printing, i.e. number-up (N-up) printing, imposition, and so on, for outputting images of plural pages as one image is executed, the distributing processor 32 distributes each image data so that the image data of plural pages, which are output on one physical page (a processing unit area) by the image output sections 41Y, 41M, 41C, and 41K, are rasterized by same RIP in the RIPS 33 to 36 (a first distributing method).

The distributing processor 32 may further select either the first distributing method or a second distributing method where the image data are distributed so that the image data of plural pages to be output on one physical page are separated into the RIPS 33 to 36 and are rasterized.

For instance, when the pages corresponding to the image data to be output are merged into one physical page, if number of the physical pages is more than number of RIPs e.g. the RIPs 33 to 36, the distributing processor 32 selects the first distributing method. However, if number of the physical pages is less than number of RIPs e.g. the RIPs 33 to 36, the distributing processor 32 selects the second distributing method.

In particular, when aggregate printing for printing four logical pages laid out on one physical page is performed, if there are only three physical pages, the second distributing method is selected because of the number less than number of the RIPs 33 to 36, i.e. four.

The unit of the image data distributed to the RIPs 33 to 36 by the distributing processor 32 is not limited to one logical page. The distributing processor 32 may distribute the image data, by a predetermined unit, to the RIPs 33 to 36.

The RIPs 33 to 36 perform image processing for converting the image data of logical page to each print data for each color YMCK, respectively.

The output controllers 37Y, 37M, 37C, and 37K are provided corresponding to each of the colors YMCK, that is, plural image output sections 41Y, 41M, 41C, and 41K, respectively. Therefore, the output controllers 37Y, 37M, 37C, and 37K control the output processing of plural image output sections 41Y, 41M, 41C, and 41K for the print data of each color subjected to the image processing with the RIPs 33 to 36, respectively.

For instance, in print data of the first logical page i.e. P1(Y), P1(M), P1(C), and P1(K) which are rasterized on a color-to-color basis by the RIP 33, the print data of P1(Y) for yellow printing are transferred to the output controller 37Y; the print data of P1(M) for magenta printing are transferred to the output controller 37M; the print data of P1(C) for cyan printing are transferred to the output controller 37C; and the print data of P1(K) for black printing are transferred to the output controller 37K.

When aggregate printing is performed, the output controllers 37Y, 37M, 37C, and 37K generate the print data for physical page by combining the plural page print data of logical page for each color which are transferred from plural RIPs 33 to 36, and transmit the generated print data of physical page to the image output sections 41Y, 41M, 41C, and 41K, respectively.

Figure 4:
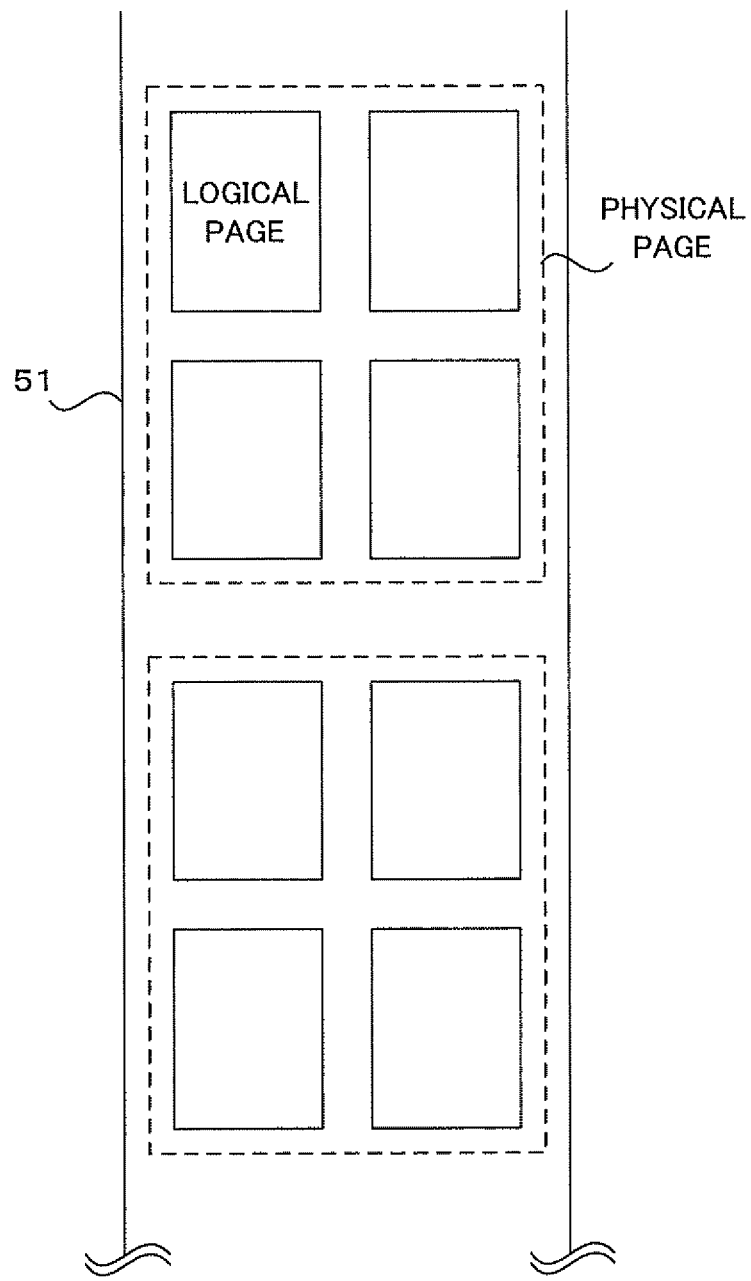
FIG. 4 is a diagram illustrating a continuous paper 51 which is subjected to aggregate printing for outputting four images on a physical page.

Next, FIG. 4 illustrates the continuous paper 51 subjected to aggregate printing for outputting images of four pages as a physical page by the image forming system according to the exemplary embodiment of the present invention. In this case, the images of four pages output on the physical page are referred to as a logical page, respectively.

In aggregate printing, as shown in FIG. 4, an image of physical page is sequentially printed on the continuous paper 51, and each physical page has four logical pages laid out thereon. After the printing, the continuous paper 51 is cut out by a physical page or a logical page with e.g. a cutting device non-illustrated.

Figure 5:
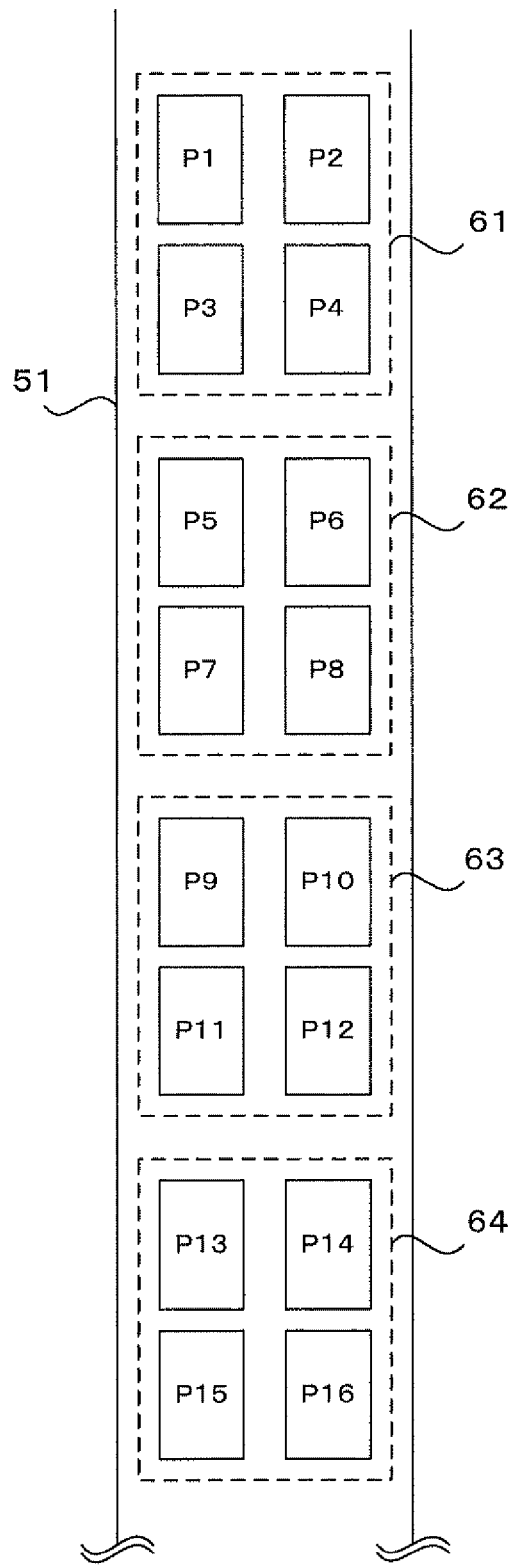
FIG. 5 is a diagram explaining with respect to page number allocated to the image data of each logical page to be output on the continuous paper 51.

Note that it will be described below that page number shown in FIG. 5 is allocated to the image data of each logical pages output on the continuous paper 51.

In the example shown in FIG. 5, a physical page 61 consists of logical pages P1 to P4; a physical page 62 consists of logical pages P5 to P8; a physical page 63 consists of logical pages P9 to P12; and a physical page 64 consists of logical pages P13 to P16.

Figure 6:
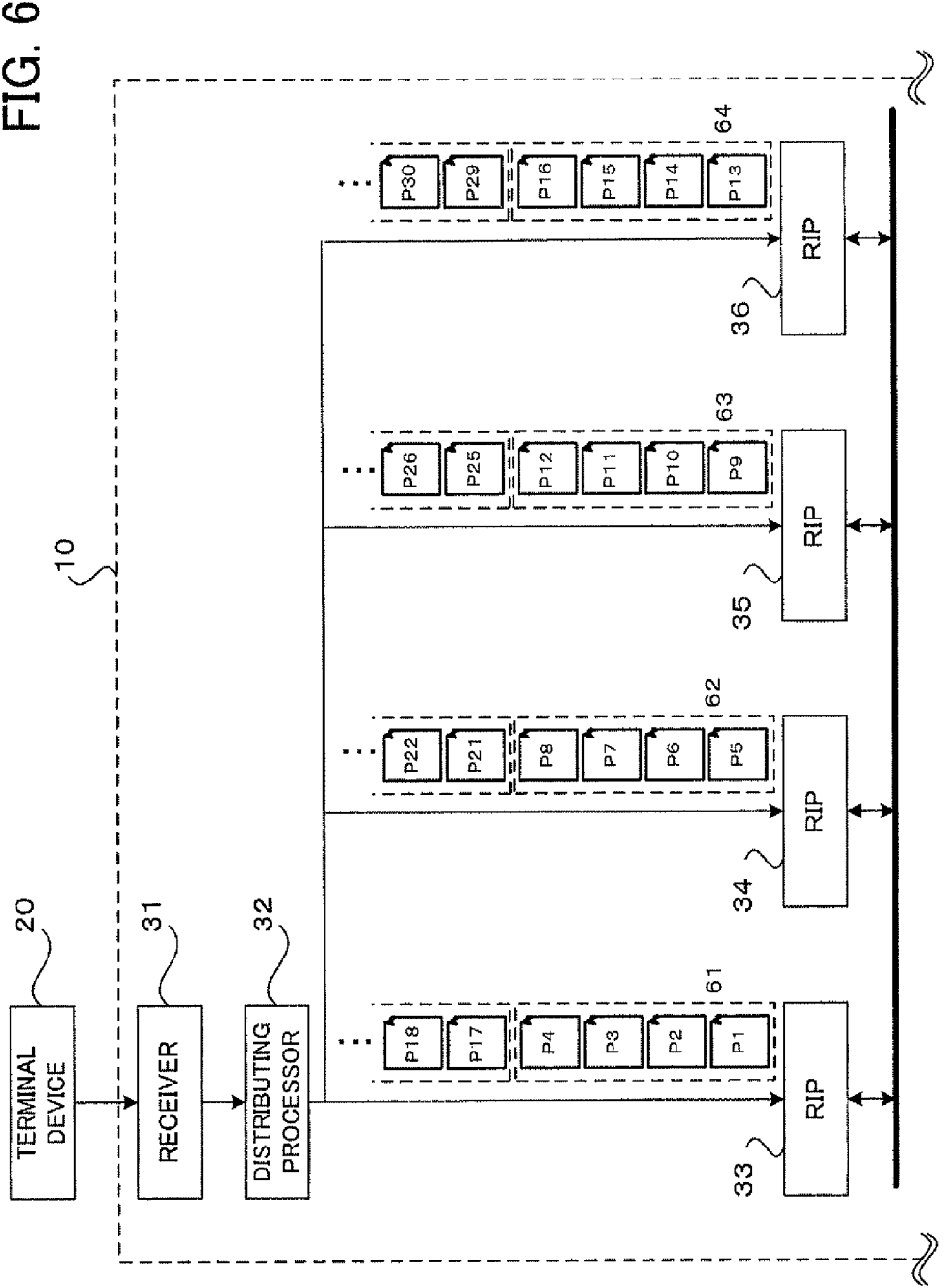
FIG. 6 is a diagram explaining the distributing processing in a first distributing method performed by a distributing processor 32.

The distributing method of the distributing processor 32 in the printing shown in FIG. 5 will be described with reference to FIG. 6. FIG. 6 illustrates the distributing processing in the first distributing method.

In the first distributing method, the distributing processor 32 distributes, as shown in FIG. 6, so that the image data of four logical pages output on a physical page are rasterized by the same RIP in the RIPs 33 to 36. In particular, the distributing processor 32 distributes all the four-logical-page image data P1 to P4 to the RIP 33 for outputting on the physical page 61; the distributing processor 32 distributes all the four-logical-page image data P5 to P8 to the RIP 34 for outputting on the physical page 62; the distributing processor 32 distributes all the four-logical-page image data P9 to P12 to the RIP 35 for outputting on the physical page 63; and the distributing processor 32 distributes all the four-logical-page image data P13 to P16 to the RIP 36 for outputting on the physical page 64.

Further, the distributing processor 32 distributes all the following four-logical-page image data P17 to P20 to the RIP 33 for outputting on the next physical page.

Next, the configuration of the output controllers 37Y, 37M, 37C, and 37K shown in FIG. 3, will be described. The output controllers 37Y, 37M, 37C, and 37K have same configurations except concerning a color. Therefore, only the configuration of the output controller 37Y will be described below with reference to FIG. 7.

Figure 7:
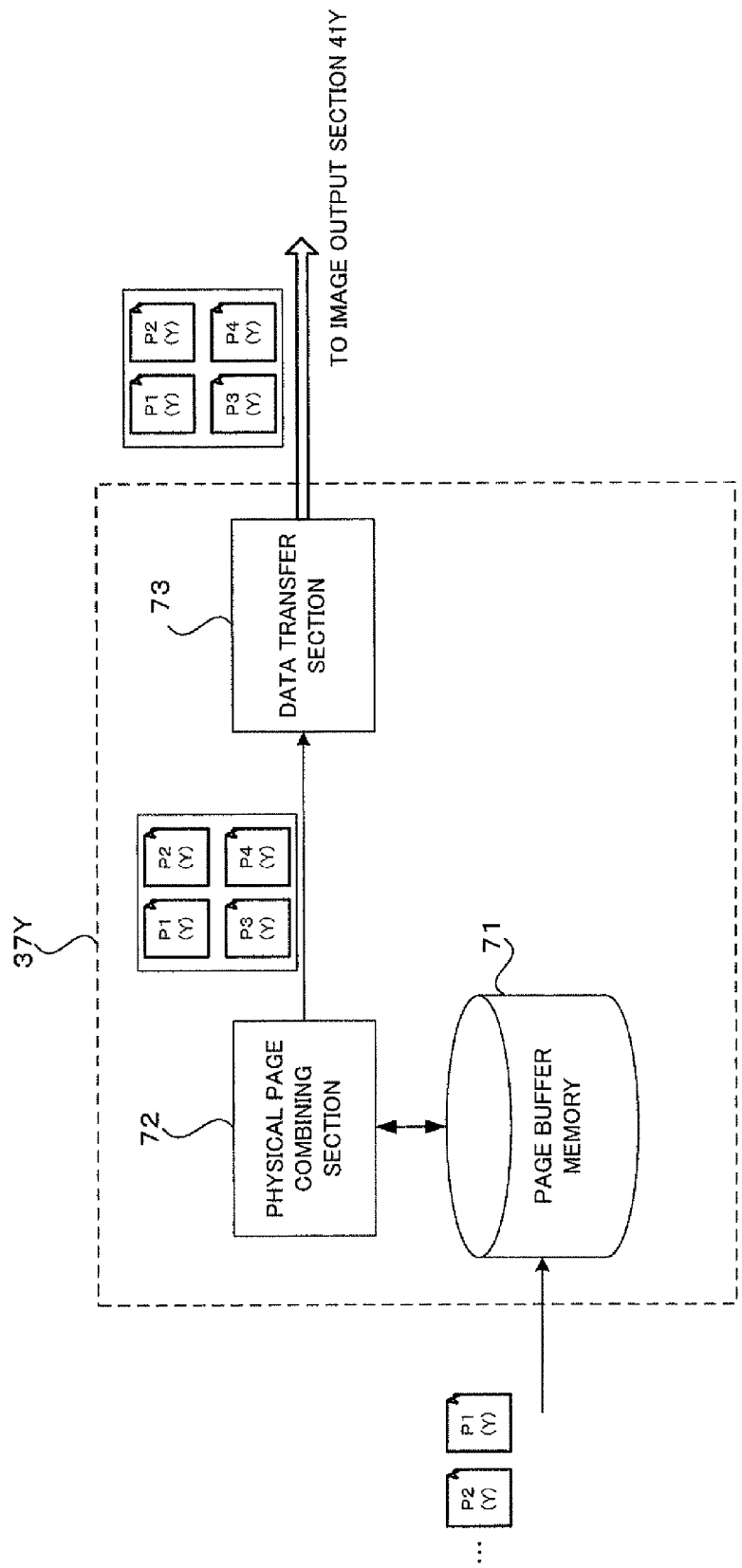
FIG. 7 is a block diagram illustrating a functional configuration of the output controller 37Y shown in FIG. 3.

The output controller 37Y has a page buffer memory 71, a physical page combining section 72, and a data transfer section 73 as shown in FIG. 7.

The page buffer memory 71 stores the print data for yellow printing transferred from the RIPs 33 to 36. In aggregate printing, the physical page combining section 72 generates a physical page to be output by pasting the plural logical pages corresponding to the print data for each color stored in the page buffer memory 71 into a physical page i.e. a processing unit area of the image output section 41Y. The physical page combining section 72 serves as a print data combining unit for executing aggregate printing so as to output images of plural pages in a one-page image. As noted above, the physical page combining section 72 generate the print data of physical page by combining images of plural pages rasterized by a single RIP.

FIG. 7 illustrates a case that four logical pages P1(Y), P2(Y), P3(Y), and P4(Y) are pasted into the physical page.

The data transfer section 73 transfers the print data of the physical page generated by the physical page combining section 72 to the corresponding image output section 41Y in the printing device 1.

Next, the operation of the image forming system according to the exemplary embodiment of the present invention will be described in detail with reference to the drawings.

Figure 8:
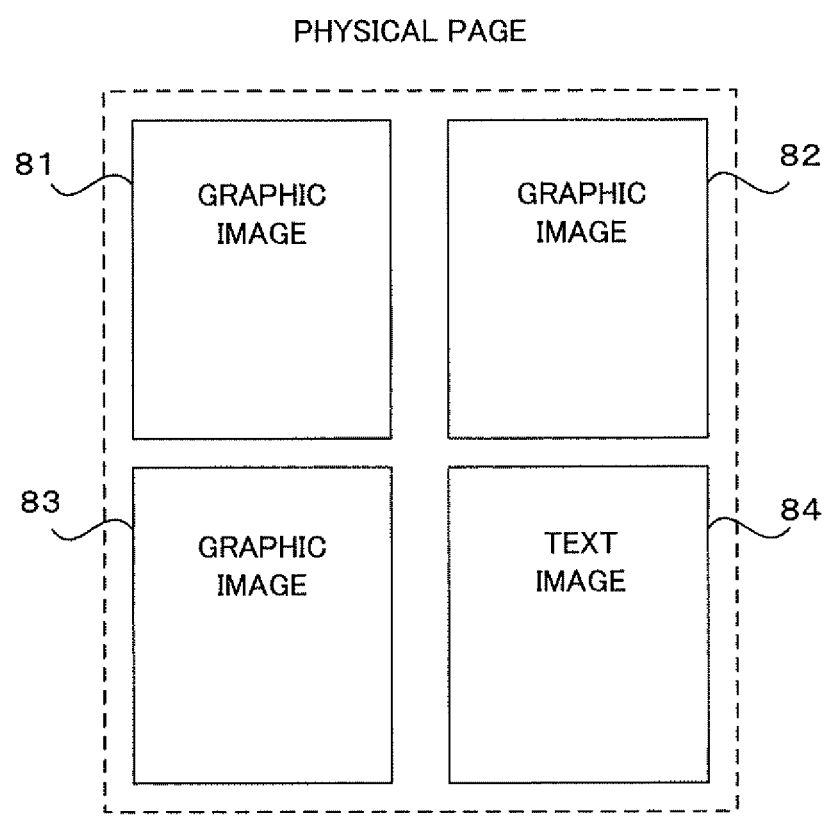
FIG. 8 is a diagram illustrating a configuration of a physical page in a case where aggregate printing for printing with four logical pages laid out on a physical page is performed.

The case where a physical page shown in FIG. 8 is repeatedly outputted on the continuous paper will be described below.

In FIG. 8, four logical pages 81 to 84 are laid out on a physical page. The three logical pages 81 to 83 are graphic images, and the logical page 84 is a text image. Therefore, while the logical pages 81 to 83 have a heavy workload for converting to the image data for each color printing, the logical page 84 has a light workload for converting to the image data for each color printing.

Figure 9:
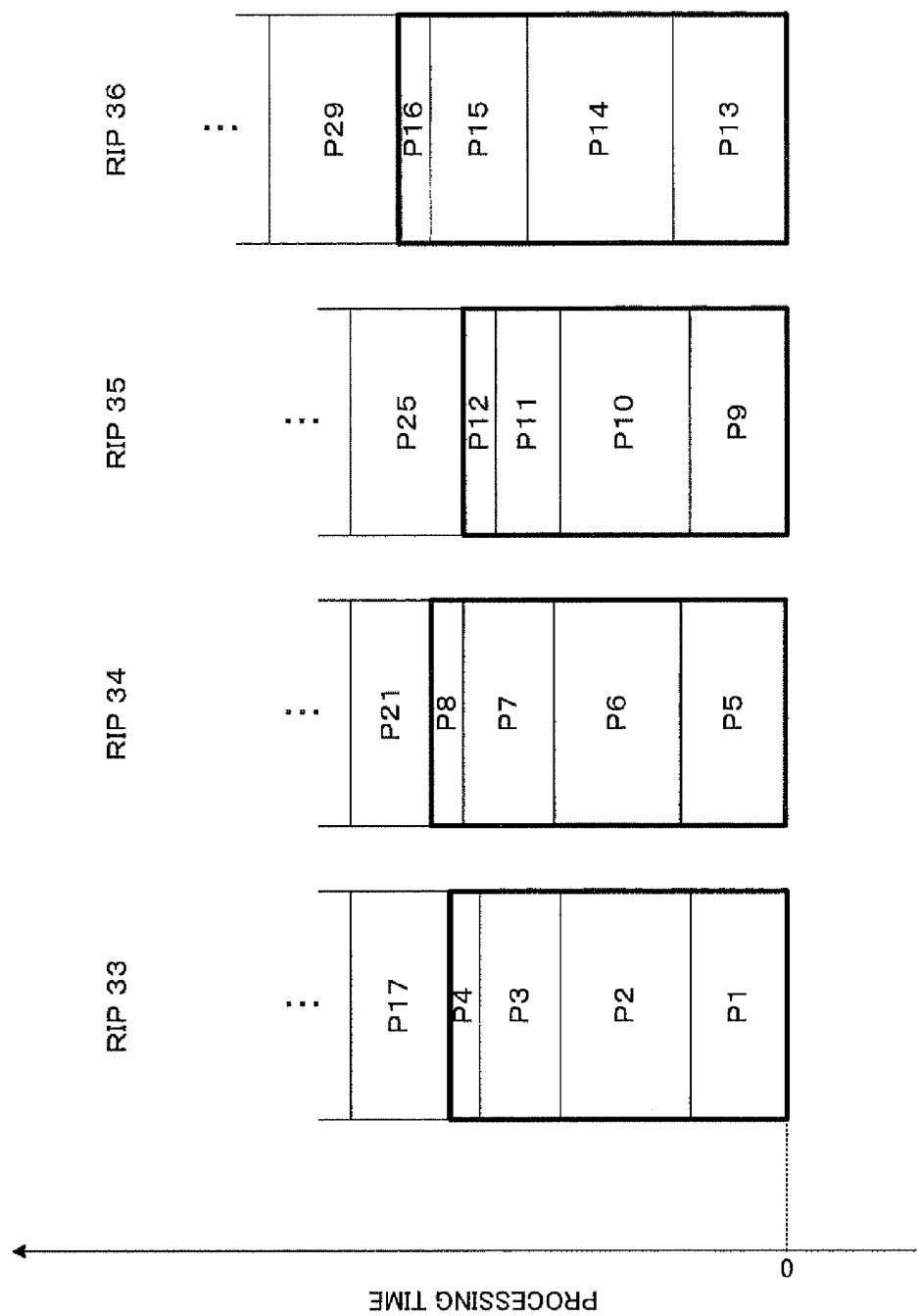
FIG. 9 is a diagram illustrating the time course of the image processing with the RIPS 33 to 36 in the case where the distributing processor 32 distributes each image data of logical pages to the RIPs 33 to 36 in the first distributing method for performing aggregate printing of FIG. 8.

FIG. 9 illustrates a diagram for explaining the time course of the image processing with the RIPs 33 to 36 in the case where the distributing processor 32 distributes the image data of each of logical pages to the RIPs 33 to 36 in the first distributing method, in aggregate printing of FIG. 8.

FIG. 9 shows that although the processing load of the fourth logical page e.g. P4, P8, P12, P16, or the like corresponding to the logical page 84 is significantly lighter than the first to third logical pages thereof, there is not much difference between the processing time for rasterizing the image data of a physical page in the RIPs 33 to 36.

However, the distributing processing in the first distributing method may prolong time elapsed from the beginning of the printing to the completion of the printing of the first physical page. Therefore, at the beginning of the printing, the distributing processor 32 may select the second distributing method for distributing the image data to the RIPs 33 to 36, and subsequently change the second distributing method to the first distributing method in the case where the amount of the image data rasterized by the RIPs 33 to 36 are more than the predetermined value.

Figure 10:
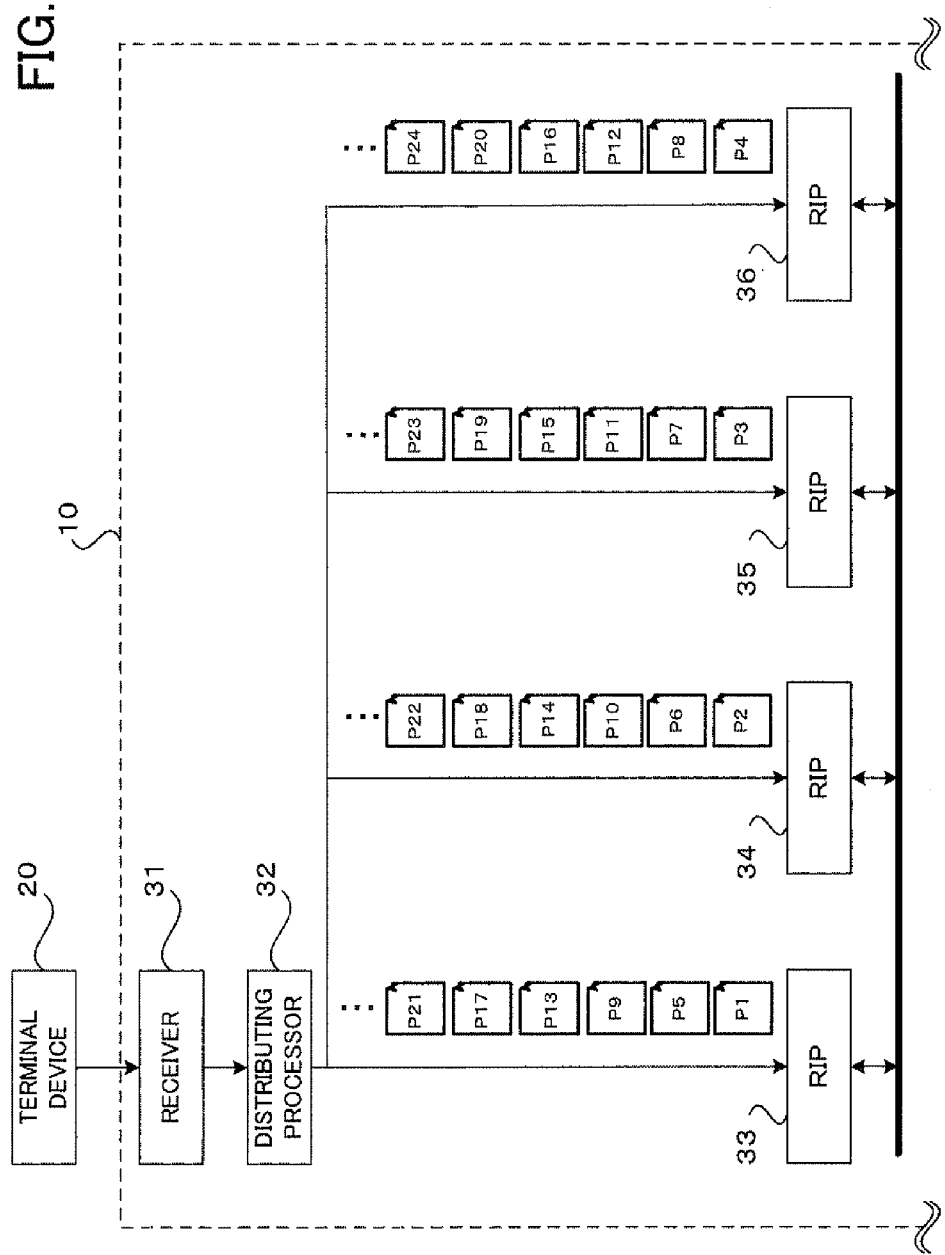
FIG. 10 is a diagram explaining the distributing processing in a second distributing method, performed by the distributing processor 32.

For instance, the distributing processor 32 performs the distributing processing in the second distributing method as shown in FIG. 10 at the beginning of the printing.

In the distributing processing in the second distributing method in FIG. 10, the distributing processor 32 sequentially distributes each of the logical pages e.g. P1, P2 and the like, page by page, to four RIPs 33 to 36.

FIG. 11 shows that the time course of the image processing by the RIPs 33 to 36 in the case where the distributing processor 32 distributes the image data of each of logical pages to the RIPs 33 to 36, in the second distributing method as mentioned above.

In the example of FIG. 11, the processing load for the forth logical page e.g. P4, P8, P12, P16 or the like is significantly lighter than the first to third logical pages thereof, and therefore the processing load of the RIP 36 lightens. Accordingly, there is much difference between the processing times for rasterizing the image data of a physical page in the RIPs 33 to 36.

However, FIG. 11 shows that the distributing processing in the second distributing method fastens the processing time t1 from the beginning of the printing to the completion of the printing of the four logical pages P1 to P4 for outputting the first physical page, compared with the processing time in FIG. 9.

The Modified Example

The above description of the exemplary embodiment of the present invention explains that the distributing processor 32 distributes image data divided into each page to the RIPs 33 to 36. However, the configuration of the present invention is not limited the above configuration. The distributing processor 32 may transmit a processing request, which designates the area of the image data to be subjected to the image processing, to the RIPs 33 to 36 so that the RIPs 33 to 36 respectively perform the image processing for the designated page(s) based on the transmitted processing request.

The above description of the exemplary embodiment of the present invention further explains that the exemplary embodiment of the present invention is applied to the image forming system for printing on the continuous paper. However the present invention is not limited the above application, and may be applied to the image forming system for printing on a printing paper separated by page, i.e. a cut sheet as well.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control device comprising:
a distributing unit that distributes received image data page by page;
a plurality of image processing units that perform image processing for converting the image data distributed by page from the distributing unit into print data; and
a plurality of output control units configured to communicate with a plurality of image output sections respectively, and control the output processing of each of the plurality of the image output sections based on the print data generated by the image processing of the plurality of the image processing units, respectively, each output control unit and respective image output section corresponding to a different color,
when aggregate printing where images of a plurality of pages are merged into one image and output is executed, the distributing unit distributes the image data so that the received image data is subjected to the image processing by different image processing units in parallel,
wherein each of the plurality of image processing units is configured to transmit print data corresponding to the different colors to each of the plurality of output control units,
wherein the plurality of the output control units generate print data in units of plurality of pages by combining the print data transferred respectively from the plurality of the image processing units processed in parallel, and transmit the generated print data to the image output sections corresponding to the output control units, respectively, and
wherein the distributing unit changes the distributing method to distribute the image data so that the image data is subjected to the image processing by a single image processing unit when the data amount of the completed print data by the plurality of image processing units becomes more than a predetermined value corresponding to completion of at least one physical page.

2. The printing control device according to claim 1, wherein if number of units composed of the image data is more than number of the plurality of image processing units, the distributing unit changes the distributing method to distribute the image data so that the image data is subjected to the image processing by a single image processing unit.

3. An image forming system comprising:

a distributing unit that distributes received image data page by page;

a plurality of image processing units that perform image processing for converting the image data distributed by page from the distributing unit into print data; and a plurality of output control units configured to communicate with a plurality of image output sections respectively, and control the output processing of each of the plurality of the image output sections based on the print data generated by the image processing of the plurality of the image processing units, respectively, each output control unit and respective image output section corresponding to a different color, when aggregate printing where a plurality of pages of images are merged into one image and output is executed, the distributing unit distributes the image data so that the image data is subjected to the image processing by different image processing units in parallel, wherein each of the plurality of image processing units is configured to transmit print data corresponding to the different colors to each of the plurality of output control units, wherein the plurality of the output control units generate print data in units of plurality of pages by combining the print data, transferred respectively from the plurality of the image processing units in parallel, and transmit the generated print data to the image output sections corresponding to the output control units, respectively, and wherein the distributing unit changes the distributing method to distribute the image data so that the image data is subjected to the image processing by a single image processing unit when the data amount of the completed print data by the plurality of image processing units becomes more than a predetermined value corresponding to completion of at least one physical page.

4. A printing control device comprising:

a distributing unit that distributes received image data page by page;

a plurality of image processing units that perform image processing for converting the image data distributed by page from the distributing unit into print data; and a plurality of output control units configured to communicate with a plurality of image output sections respectively, and control the output processing of each of the plurality of the image output sections based on the print data generated by the image processing of the plurality of the image processing units, respectively, each output control unit and respective image output section corresponding to a different color, when aggregate printing where images of a plurality of pages are merged into one image and output is executed, the distributing unit operates using a first distributing method to distribute the image data so that the image data is subjected to the image processing by a single image processing unit, and the distributing unit operates using a second distributing method, to distribute the image data so that the image data is subjected to the image processing by different image processing units in parallel, wherein each of the plurality of image processing units is configured to transmit print data corresponding to the different colors to each of the plurality of output control units, and wherein the plurality of the output control units generate print data in units of plurality of pages by combining the plurality of page print data transferred respectively from the plurality of the image processing units processed in parallel, and transmit the generated print data to the image output sections corresponding to the output control units, respectively; and the distributing unit selects the second distributing method at the beginning of the output processing for distributing the image data to the plurality of image processing units, and when the data amount of the completed print data by the plurality of image processing units become more than a predetermined value, alternatively selecting the first distributing method for distributing.

5. An image forming system comprising:

a plurality of image output sections;

a distributing unit that distributes received image data page by page;

a plurality of image processing units that perform image processing for converting the image data distributed by page from the distributing unit into print data;

a plurality of output control units configured to communicate with the plurality of image output sections respectively, and control the output processing of each of the plurality of the image output sections based on the print data generated by the image processing of the plurality of the image processing units, respectively, each output control unit and respective image output section corresponding to a different color; and a print data combining unit that executes aggregate printing for merging a plurality of pages of images into one image and outputting, when aggregate printing where images of a plurality of pages are merged into one image and output is executed, the distributing unit operates using a first distributing method to distribute the image data so that the image data of the plurality of pages are subjected to the image processing by a single image processing unit, and the distributing unit operates using a second distributing method, to distribute the image data so that the image data of the plurality of pages are subjected to the image processing by different image processing units in parallel, wherein each of the plurality of image processing units is configured to transmit print data corresponding to the different colors to each of the plurality of output control units, and wherein the print data combining section combines print data of a plurality of pages subjected to the image processing by the single image processing unit, and the plurality of output control units transmit the print data respectively transferred from the print data combining section, to the image output sections corresponding to the output control units, respectively, and the distributing unit selects the second distributing method at the beginning of the output processing for distributing the image data to the plurality of image processing units processed in parallel, and when the data amount of the completed print data by the plurality of image processing units become more than a predetermined value, alternatively selecting the first distributing method for distributing.

6. A non-transitory computer readable storage medium storing a program causing a computer to execute a process for image processing, the process comprising:
- distributing image data page by page;
- performing the image processing for converting the image data distributed by page from the distributing unit into print data; and
- controlling each output processing of a plurality of image output sections based on the print data generated from the image processing,
- distributing the image data so that the plurality of page image data are subjected to different image processing in parallel, each different image processing based on a color associated with the image data, when aggregating printing where images of a plurality of pages are merged into one image and the output is executed,
- transmitting print data corresponding to the color associated with the image data according to the different image processing, and
- generating print data in units of a plurality of pages by combining the plurality of page print data transferred, and transmitting the generated print data,
- wherein, in the distributing the image data, the distributing method is changed to distribute the image data so that the image data is subjected to the image processing in series when the data amount of the completed print data processed in parallel becomes more than a predetermined value corresponding to completion of at least one physical page.

* * * * *